United States Patent
Sheets

(10) Patent No.: US 8,078,536 B2
(45) Date of Patent: *Dec. 13, 2011

(54) METHOD AND SYSTEM FOR CROSS-ISSUER REGISTRATION OF TRANSACTION CARDS

(75) Inventor: John F. Sheets, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/982,662

(22) Filed: Dec. 30, 2010

(65) Prior Publication Data

US 2011/0125624 A1    May 26, 2011

Related U.S. Application Data

(63) Continuation of application No. 11/855,795, filed on Sep. 14, 2007, now Pat. No. 7,865,434.

(60) Provisional application No. 60/825,733, filed on Sep. 15, 2006.

(51) Int. Cl.
*G06Q 40/00* (2006.01)
(52) U.S. Cl. .......... 705/39; 705/40; 705/42; 705/44
(58) Field of Classification Search ............ 705/38, 705/39, 40, 42, 44
See application file for complete search history.

(56) References Cited

U.S. PATENT DOCUMENTS

| | | | |
|---|---|---|---|
| 6,990,470 B2 * | 1/2006 | Hogan et al. ............... | 705/64 |
| 2001/0008015 A1 | 7/2001 | Vu et al. | |
| 2002/0077837 A1 | 6/2002 | Krueger et al. | |
| 2003/0155416 A1 * | 8/2003 | Macklin et al. ............. | 235/380 |
| 2004/0155101 A1 | 8/2004 | Royer et al. | |
| 2005/0240522 A1 * | 10/2005 | Kranzley et al. ........... | 705/40 |

OTHER PUBLICATIONS

KeyBank Expands Identity Theft Protection, PR Newswire, Sep. 19, 2005. p. 1.*
KeyBank Expands Identity Theft Protection, Sep. 19, 2005, p. 1, PR Newswire, New York.

* cited by examiner

*Primary Examiner* — Lindsay M Maguire
*Assistant Examiner* — Hao Fu
(74) *Attorney, Agent, or Firm* — Kilpatrick Townsend & Stockton LLP

(57) ABSTRACT

Disclosed herein is a method of providing one or more transaction card services to a holder of a transaction card, the method comprising receiving a registration code from the holder, wherein the registration code is associated with the issuer of the transaction card and with the transaction card, determining the issuer of the transaction card based on at least a portion of the registration code, transmitting the registration code to the issuer of the transaction card, receiving account information from the issuer, wherein the account information is associated with the registration code and with the transaction card, displaying at least a portion of the account information to the holder, receiving a verification value corresponding to the account information from the holder, and if the verification value is valid, permitting the holder to select one or more services in which to enroll.

19 Claims, 4 Drawing Sheets

US 8,078,536 B2

METHOD AND SYSTEM FOR CROSS-ISSUER REGISTRATION OF TRANSACTION CARDS

REFERENCE TO RELATED APPLICATIONS

This application is a continuation of and claims priority to U.S. patent application Ser. No. 11/855,795 entitled "METHOD AND SYSTEM FOR CROSS-ISSUER REGISTRATION OF TRANSACTION CARDS" filed Sep. 14, 2007, which claims priority to U.S. provisional application No. 60/825,733, filed Sep. 15, 2006, and entitled "METHOD AND SYSTEM FOR CROSS-ISSUER REGISTRATION OF TRANSACTION CARDS," each of which are incorporated herein by reference in their entirety for all purposes.

BACKGROUND

Transaction cards, such as credit cards, debit cards and the like, are commonly used by consumers to perform transactions. Transaction cards are so common because such cards have numerous advantages over alternative payment options. For example, such cards are often considered to be more convenient than carrying cash for a consumer because they are more compact and less likely to be lost. Moreover, if a transaction card is lost, the card can be cancelled with minimal loss to the cardholder Because of the advantages of carrying transaction cards, cardholders often possess numerous cards. In fact, a typical cardholder may have between eight and ten transaction cards. As a result, a single cardholder could have multiple cards offered by the same association, such as Visa®, MasterCard®, or American Express®.

Transaction card issuers, such as banks, often provide services in conjunction with a transaction card. For example, an issuer may offer a payment alert program to provide notice to a cardholder when a transaction card is used to perform a transaction. Other services may include cardholder controls (under which restrictions may be placed upon a secondary cardholder who is able to use the transaction card), fraud protection (protection against transactions performed by an unauthorized third party if a transaction card is lost or stolen by a cardholder), and the like.

Presently, a cardholder that desires to enroll in one or more of such services must inconveniently enroll in the services with the issuer for each transaction card. Because of such inconvenience, a cardholder could be enrolled in a service with an issuer for one transaction card but not for another transaction card offered by the same association, when the cardholder would prefer to have all transaction cards offered by the same association enrolled in the service. Moreover, a cardholder could be unaware or forget that a particular desired service has not been obtained for a particular transaction card. This can cause confusion among cardholders.

What are needed are methods and systems for enabling cardholders to enroll in one or more services for one or more transaction cards at a central location, where the transaction cards are issued by a plurality of issuers.

A need exists for methods and systems of aggregating cardholder information across all issuers.

A need exists for methods and systems for securely enabling a cardholder to register for one or more services without exposing sensitive cardholder information and that substantially limit the possibility for erroneous association of a transaction card without an unauthorized account.

The present disclosure is directed to solving one or more of the above-listed problems.

SUMMARY

Before the present methods are described, it is to be understood that this invention is not limited to the particular methodologies or protocols described, as these may vary. It is also to be understood that the terminology used herein is for the purpose of describing particular embodiments only, and is not intended to limit the scope of the present disclosure, which will be limited only by the appended claims.

It must be noted that as used herein and in the appended claims, the singular forms "a," "an," and "the" include plural reference unless the context clearly dictates otherwise. Thus, for example, reference to a "certificate" is a reference to one or more certificates and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a method of providing one or more services to a cardholder may include generating, by an issuer, a registration code, sending the registration code to a cardholder, receiving the registration code from the cardholder, determining the issuer based on at least a portion of the registration code, transmitting the registration code to the issuer, receiving an account identifier associated with the registration code from the issuer, displaying at least a portion of the account identifier to the cardholder, receiving a verification value from the cardholder corresponding to the account identifier, and permitting the cardholder to select one or more services, if the verification value is valid.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
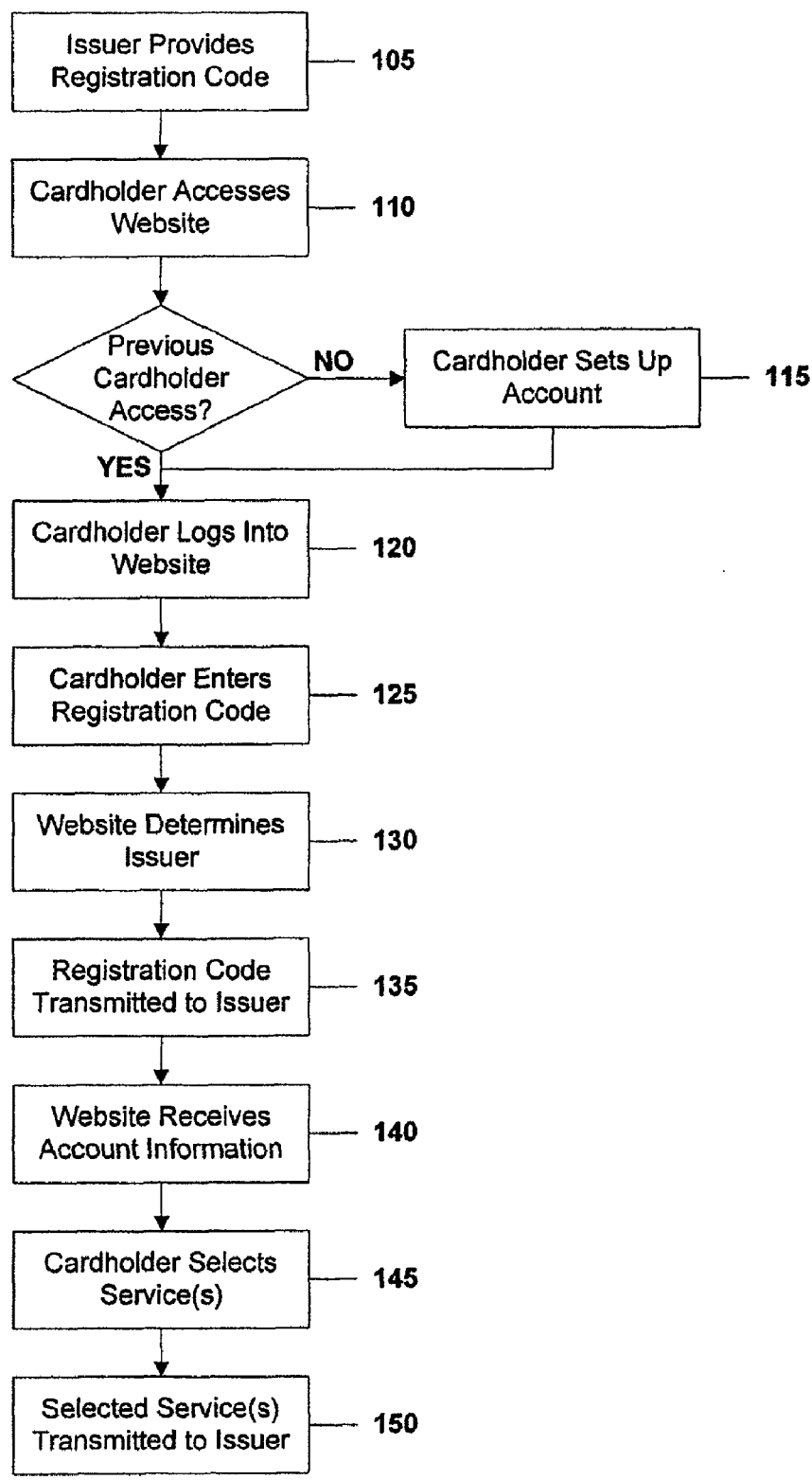
FIG. 1 depicts a flow diagram of an exemplary process of providing one or more services to a cardholder for a plurality of transaction cards according to an embodiment.

FIG. 1 depicts a flow diagram of an exemplary process of providing one or more services to a cardholder for a plurality of transaction cards according to an embodiment. As depicted in FIG. 1, an issuer may provide 105 a registration code to a cardholder. The registration code may be provided as part of a monthly statement, via an issuer's online account management system and/or via other cardholder support channels, such as telephone, direct mailing programs, and the like. The registration code is a code that is uniquely assigned to a cardholder for a particular service and/or all services offered by the issuer. In an embodiment, the registration code may be an alphanumeric code. In an embodiment, the registration code is not correlated to the cardholder's primary account number (PAN) or any other cardholder identifying information. As such, sensitive cardholder information may not be determinable from the registration code. A particular cardholder may receive a registration code for one or more transaction cards and/or from one or more issuers. In an embodiment, each transaction code may include an issuer identification code that uniquely identifies the issuer of the registration code.

The cardholder may then access 110 a website, such as a transaction card association website. If the cardholder has not previously accessed the website, the cardholder may perform 115 a one-time account setup by selecting a username, password (or other authentication token), and/or the like. If the cardholder has already created an account at the website or once the cardholder completes the one-time account setup, the cardholder may log into 120 the account.

The cardholder may then register 125 one or more cards by entering the registration code provided by each issuer for each transaction card. When a registration code is entered for a particular transaction card, the website may determine 130 an issuer based on the registration code and transmit 135 the registration code to the issuer. In response, the website may receive 140 account information for the cardholder's account with the issuer. In an embodiment, one or more fields of the cardholder's account information may be masked to prevent the display of sensitive information. In an embodiment, the account information may be received 140 in an encrypted format and decrypted by the website. Additionally, a list of services offered by the issuer may also be received and used to determine which services to offer the cardholder. The cardholder may then select 145 one or more services to be applied to the account. Once the cardholder completes selection of the one or more services, the website may transmit 150 the selected services to the issuer for processing and enrollment.

Figure 2:
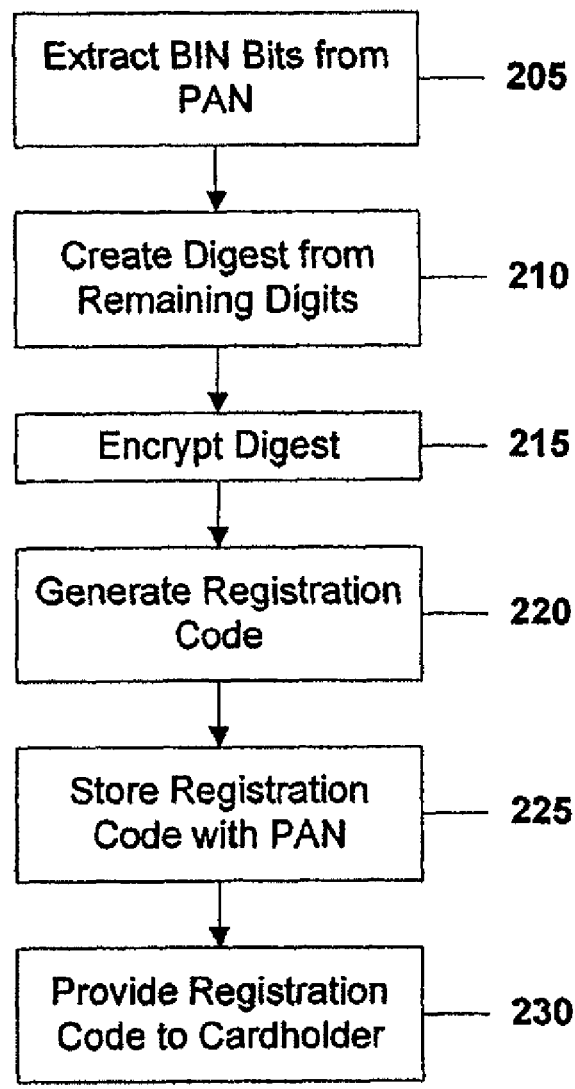
FIG. 2 depicts a flow diagram of an exemplary process for associating a registration code with a consumer according to an embodiment.

FIG. 2 depicts a flow diagram of an exemplary process for associating a registration code with a consumer according to an embodiment. As shown in FIG. 2, the issuer may select one or more account numbers for which to offer one or more services. For each account, the issuer may remove 205 the bank identification number (BIN) from the PAN for the account. A digest may be created 210 using the remaining digits. In a preferred embodiment, the SHA-1 hashing algorithm is used to create this digest. The digest may then be encrypted 215. A registration code may be generated 220 using the digest and stored 225 in memory with the associated account number or the digest. The registration code may then be provided 230 to the transaction cardholder.

Figure 3:
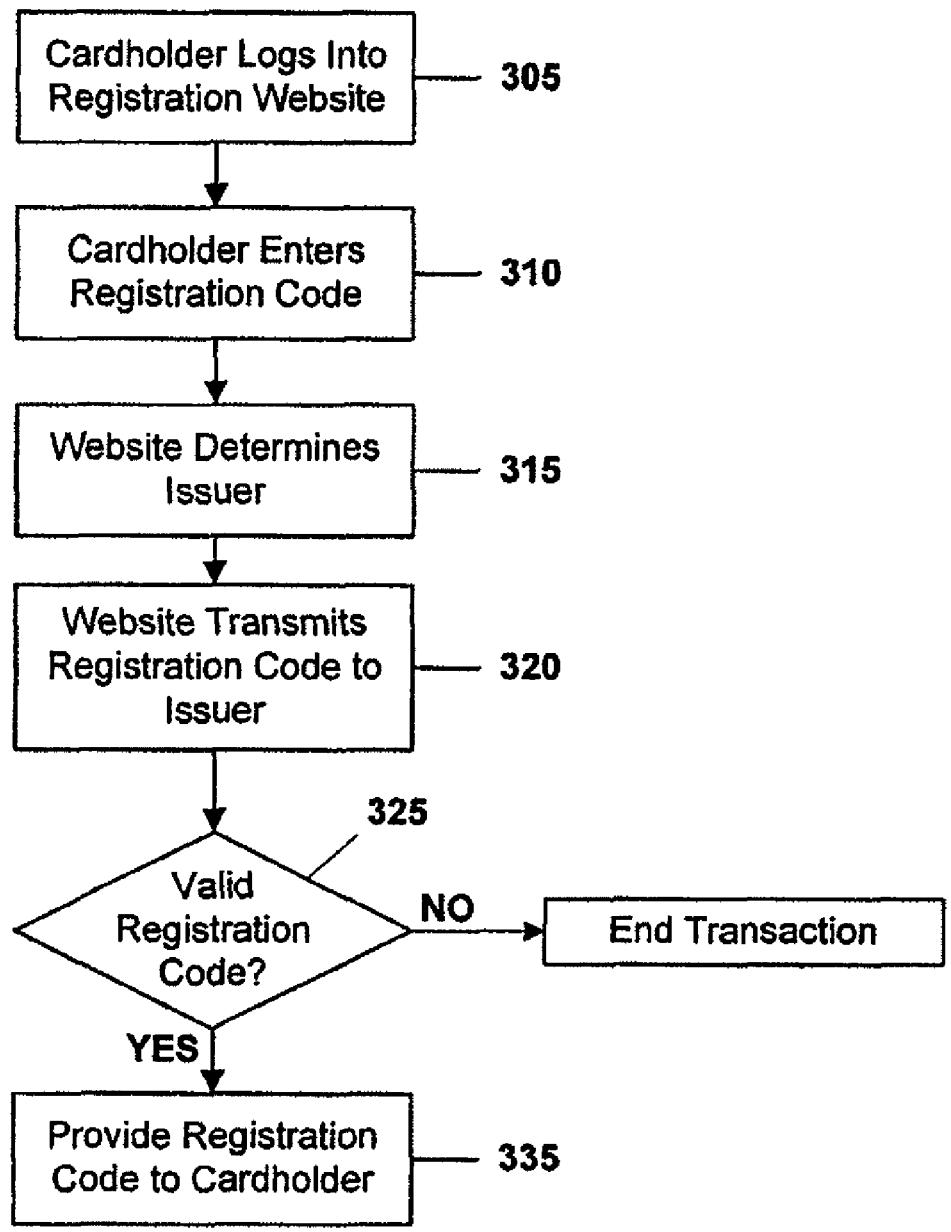
FIG. 3 depicts a flow diagram of an exemplary process for registering a consumer on a central website according to an embodiment.

FIG. 3 depicts a flow diagram of an exemplary process for registering a consumer on a central website according to an embodiment. As shown in FIG. 3, a cardholder may log into 305 a registration website by, for example, providing a username, a password, and/or any other authentication token. The cardholder may then enter 310 a registration code provided by an issuer. A computer system associated with the registration website may determine 315 an issuer associated with the registration code and transmit 320 the registration code to the issuer. The issuer may determine 325 whether the registration code is valid and determine the account associated with the registration code. The issuer may then transmit 330 account information for the associated account to the registration website.

Figure 4:
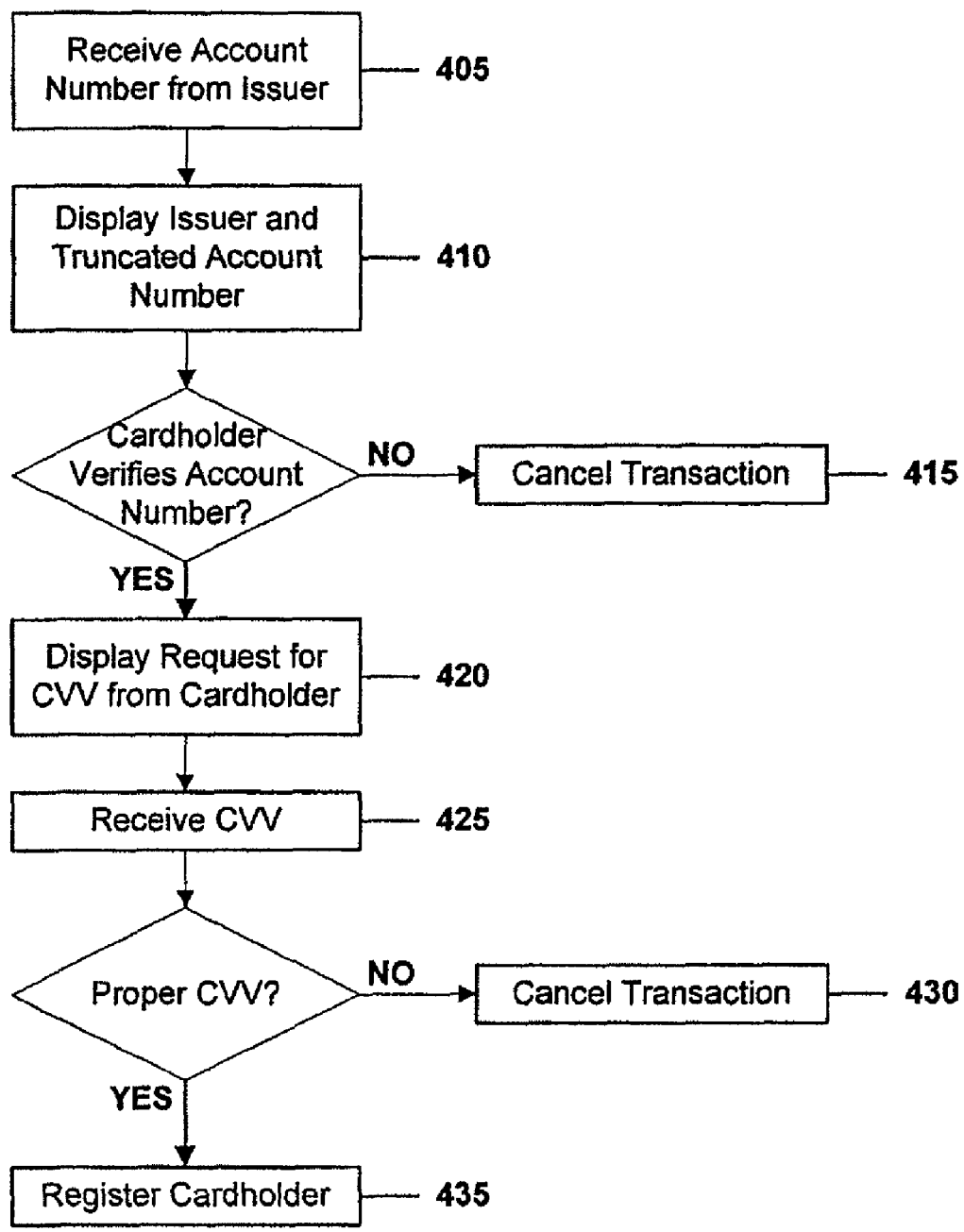
FIG. 4 depicts a flow diagram for an exemplary process of verifying a cardholder according to an embodiment.

FIG. 4 depicts a flow diagram for an exemplary process of verifying a cardholder according to an embodiment. As shown in FIG. 4, the registration website may receive 405 the truncated account number from the issuer. The issuer and the truncated account number may then be displayed 410 to the cardholder. If the displayed account number is improper, the transaction may be cancelled 415. If the cardholder verifies that the account number is proper, the registration website may display 420 a request for the associated transaction card's card verification value (CVV). The cardholder may then enter 425 a CVV for the transaction card. If the cardholder enters an improper CVV, the transaction may be cancelled 430. Otherwise, the cardholder may be registered 435 with the registration website.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

The invention claimed is:

1. A computer implemented method of providing one or more transaction card services to a holder associated with a transaction account, the method comprising:
    receiving, by a computer system associated with a registration website, a registration code from the holder, wherein the registration code is associated with an issuer of the transaction account and with the transaction account;
    determining, by the computer system, the issuer of the transaction account based on at least a portion of the registration code;
    transmitting, by the computer system, the registration code to the issuer of the transaction account;
    receiving, by the computer system, account information from the issuer, wherein the account information is associated with the registration code and with the transaction account;
    transmitting, by the computer system, at least a portion of the account information to the holder;
    receiving, by the computer system, a verification value corresponding to the account information from the holder; and
    if the verification value is valid, permitting the holder to select one or more services in which to enroll, wherein the one or more services apply to the transaction card issued by the issuer.

2. The method of claim 1, wherein the registration code was received by the holder from the issuer.

3. The method of claim 1, wherein the registration code is not correlated to the account information.

4. The method of claim 1, wherein the registration code includes an issuer code corresponding to an issuer of the transaction account.

5. The method of claim 1, further comprising receiving account setup information from the holder before receiving the registration code from the holder.

6. The method of claim 1, wherein the account information comprises an account identifier.

7. The method of claim 1, wherein the account information is received in encrypted form.

8. The method of claim 1, wherein a portion of the account information is masked to prevent the display of sensitive information.

9. The method of claim 1, wherein the verification value is a transaction card verification value (CVV).

10. A non-transitory computer readable medium comprising code, executable by a processor form implementing a method comprising method of providing one or more transaction card services to a holder associated with a transaction account, the method comprising:
receiving a registration code from the holder, wherein the registration code is associated with an issuer of the transaction account and with the transaction account;
determining the issuer of the transaction account based on at least a portion of the registration code;
transmitting the registration code to the issuer of the transaction account;
receiving account information from the issuer, wherein the account information is associated with the registration code and with the transaction account;
displaying at least a portion of the account information to the holder;
receiving a verification value corresponding to the account information from the holder; and
if the verification value is valid, permitting the holder to select one or more services in which to enroll, wherein the one or more services apply to the transaction card issued by the issuer.

11. The non-transitory computer readable medium of claim 10 wherein the registration code was received by the holder from the issuer.

12. The non-transitory computer readable medium of claim 10, wherein the registration code is not correlated to the account information.

13. The non-transitory computer readable medium of claim 10, wherein the registration code includes an issuer code corresponding to an issuer of the transaction account.

14. The non-transitory computer readable medium of claim 10. wherein the method further comprises receiving account setup information from the holder before receiving the registration code from the holder.

15. The non-transitory computer readable medium of claim 10 wherein the account information comprises an account identifier.

16. A computer implemented method of providing one or more transaction card services to a holder associated with a transaction account, the method comprising:
providing, by an issuer, a registration code to a holder of an account of the issuer, wherein the holder thereafter accesses a Website to enter the registration code into the Website to register the account;
receiving, by a computer system associated with the issuer, the registration code from the Website, wherein the registration code is associated with the issuer, the issuer being associated with the transaction account;
determining, by the issuer, if the registration code is valid; and
if the registration code is valid, then transmitting, by the issuer, information associated with the transaction account to the Website;
wherein after providing the registration code by the issuer to the holder, a computer system associated with the Website receives the registration code from the holder and determines the issuer of the transaction account based on at least a portion of the registration code, and transmits, by the computer system associated with the Website, the registration code to the issuer of the transaction account;
wherein after transmitting, by the issuer, information associated with the transaction account to the Website, at least a request for a verification value corresponding to the account information of the holder is displayed to the holder;
wherein the computer system associated with the Website, receives the verification value from the holder and provides the verification value to the issuer;
wherein if the verification value is valid, the computer system associated with the Website permits the holder to select one or more services in which to enroll, and wherein the one or more services apply to the transaction card issued by the issuer.

17. The method of claim 16 wherein the registration code is generated by a process including removing a bank identification number from a PAN, generating a digest after removing the bank identification number, and generating the registration code using the digest.

18. The method of claim 16 wherein the holder is a cardholder, and is registered on the Website after providing a verification value to the Website.

19. The method of claim 16 wherein the verification value is a CVV value.

* * * * *